United States Patent [19]
Jardim

[11] 3,768,652
[45] Oct. 30, 1973

[54] WATER RECONDITIONING UNIT FOR AQUARIA
[76] Inventor: Joseph Jardim, Timehri Field, P.O. Box 867, Georgetown, Guyana
[22] Filed: Jan. 17, 1972
[21] Appl. No.: 218,251

[52] U.S. Cl.................. 210/169, 210/258, 210/260
[51] Int. Cl............................................... E04h 3/20
[58] Field of Search................... 210/169, 258, 521, 210/523, 260; 119/3, 5

[56] References Cited
UNITED STATES PATENTS
3,638,795  2/1972   Feddern et al...................... 210/169
1,758,331  5/1930   Perkins............................... 210/258
3,669,297  6/1972   Willinger........................... 210/169
3,630,368  12/1971  Lee..................................... 210/521

Primary Examiner—Frank A. Spear, Jr.
Assistant Examiner—T. A. Granger
Attorney—Leon Arthurs

[57] ABSTRACT

A water reconditioning unit for an aquarium which comprises a plurality of water conditioning cells assembled in series with each cell in flow communication with at least one neighbouring cell; at one end of said series of cells is a communicating inlet and at the other end a communicating outlet; a pump is included in said series for drawing water into the series through said inlet; circulating it in turn through said outlet and said water reconditioning unit further includes means for positioning said series of cells with the inlet and outlet aforesaid in communicating relation with the aquarium.

2 Claims, 3 Drawing Figures

PATENTED OCT 30 1973

3,768,652

WATER RECONDITIONING UNIT FOR AQUARIA

This invention relates to water reconditioning units for aquaria and, in particular, to improvements in such units adapting them not only to recondition water more effectively but also to provide increased protection for the aquaria contents.

In the prior art are many known water reconditioning devices for aquaria, However, the device herein visualized is of the type which is an entity separate from the aquarium per se being both portable and of a compact nature. Such devices as were heretofore known, for example, consisted of filtering apparatuses placed at various locations either outside or inside the aquaria; each serving to perform simple unsophisticated functions, such as filtering the aquaria water. Some of these devices were designed to be suspended on the inner or outer sides of the aquaria. Others comprised intricate systems remote from the aquaria with tubes leading thereto and still others, although compact, were placed within the aquaria occupying prized space.

It is a broad object of this invention to provide a compact water re-conditioning unit which may be removably placed in operative position on top of an aquarium and which performs several functions in reconditioning and otherwise modifying the water contained therein and at the same time provides a complete cover therefor, reducing water evaporation and external contamination, amongst other things.

A more specific object of the present invention is to provide a water reconditioning unit which is aesthetic in appearance, compact in nature, simple in design, efficient in operation and easily portable to and from an aquarium. In addition, said unit may include a housing which serves not only as a cover for the aquarium but, as well, a container for the conditioning apparatus with access facilities thereto.

A further object of the present invention is to provide a water reconditioning unit which includes a series of water conditioning stations or cells between a water inlet and a water outlet.

The various objects of this invention are achieved essentially by providing a water reconditioning unit for an aquarium which comprises a plurality of water conditioning cells assembled in series with each cell in flow communication with at least one neighbouring cell. At one end of said series of cells is a communicating inlet and at the other end a communicating outlet. A pump is included in said series for drawing water into the series through said inlet; circulating it in turn through each cell and thereafter discharging it through said outlet. Said water reconditioning unit further includes means for positioning said series of cells with the inlet and outlet aforesaid in communicating relation with the aquarium.

The foregoing objects and others, more or less broad, will become apparent from the hereinafter following description of the constituent parts, elements and principles of the invention given herein solely by way of example with reference to the embodiment herein described and illustrated in the accompanying drawing wherein like reference devices denote like parts of the invention throughout the several views and wherein.

Figure 1:
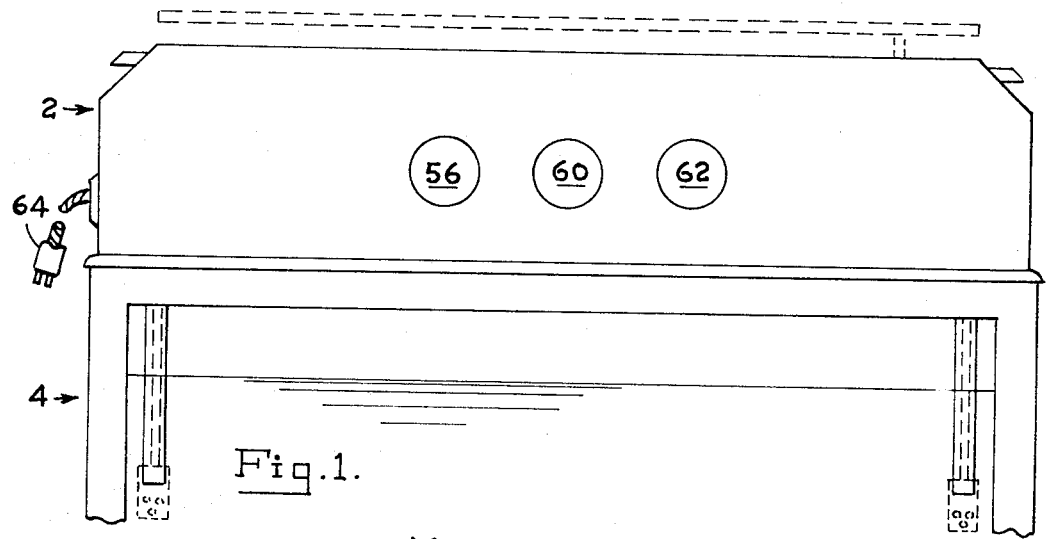
FIG. 1 is an elevational view of the front of the water reconditioning unit according to the present invention which is in position on and covering an aquarium.
Figure 2:
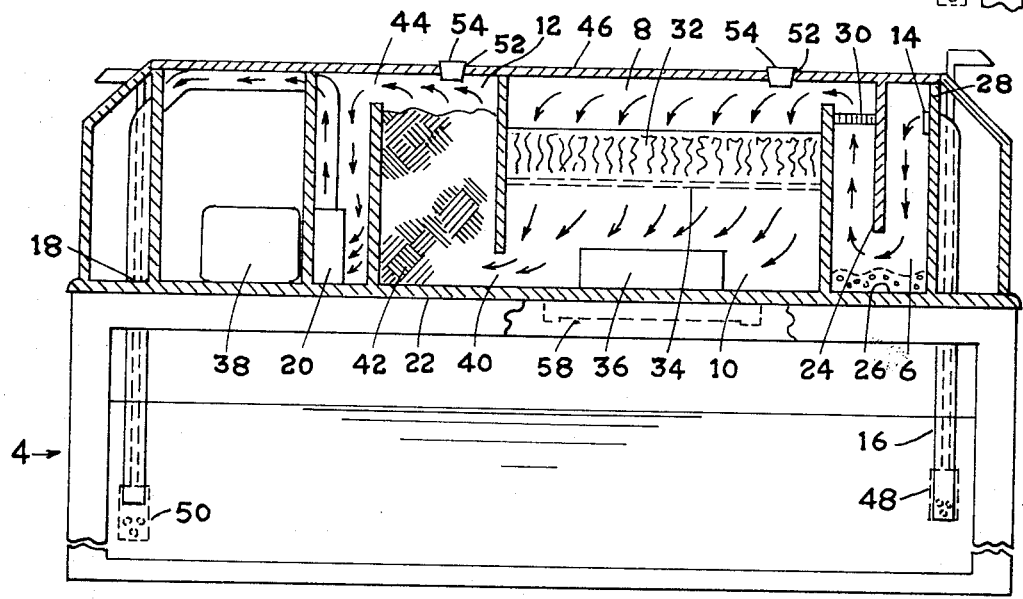
FIG. 2 is a cross-sectional view of the water reconditioning unit as shown in FIG. 1 exposing the internal parts.

In FIG. 1 is shown a water reconditioning unit 2 according to the present invention in position on and covering an aquarium 4. As shown in FIG. 2, said unit 2 includes a plurality of water conditioning cells 6, 8, 10 and 12 to be hereinafter described in greater detail, arranged in series with each cell in respective flow-communication with at least one neighbouring cell. An inlet 14 at one end of said series includes an inlet pipe 16 which is disposable inside aquarium 4 when the unit 2 is superposed thereover as in FIG. 1 and at the other end of the series there is an outlet 18 which is also in communication with said aquarium 4. A pump 20 is included in said series of cells, in this embodiment, between cell 12 and outlet 18 for example; said pump 20 being operable for drawing water from the aquarium 4 into the cell series through said inlet 14 and circulating it in turn through each of said cells and thereafter discharging it back into aquarium 4 through said outlet 18.

The invention as herein visualized further includes means for positioning said cell series with the inlet 14 and outlet 18 aforesaid in communicating relation with an aquarium; said cells being housed for this purpose in a hollow hood 22 which is seatable on said aquarium 4 to cover it with the said inlet 14 and outlet 18 opening into the aquarium.

In the present embodiment, the cells aforesaid are constructed and designed to perform several functions in succession, namely: to trap gross solids entrained in the water; to trap entrained fine solids; to temper the water by elevating its temperature to an optimal level; to filter the water through charcoal and, finally, to return it to the aquarium from which it was withdrawn in a continuous operation. In this preferred embodiment, cell 6 at the beginning of the series is coupled to water inlet 14 and is vested with the character of a settling tank for trapping gross solids entrained in the water delivered thereto by inlet 14. In the illustrated construction, the cell 6 is partitioned by a baffle 24 which depends into it from the top of hood 22 to a level spaced from cell bottom 26. Thus, water entering cell 6 near its top as at 28 must circulate downwardly then upwardly around baffle 24 back to the top of cell 6 from which it then spills into the next cell 8 preferably through a screen 30. Said cell 8 serves the function of trapping fine solids which remain entrained in the aquarium water coming from cell 6. To carry out this function there is provided a filter element 32 in cell 8 with numerous very fine pores such as might occur, for example, in a thick sponge. One effect of these fine pores is, of course, to delay passage of water therethrough and to compensate therefor amongst other things, the filtration cell 8 has a wide area over which water coming from cell 6 is spread. The tempering cell 10 is placed below the filtration cell 8 in a position to receive water percolating through the filter element 32 which may, for this purpose, be supported on a suitable foraminous shelf 34. Preferably, cell 8 or, at least, its filter 32 is removable to permit access to tempering cell 10 which is positioned therebelow to receive water filtered through cell 8.

Figure 3:
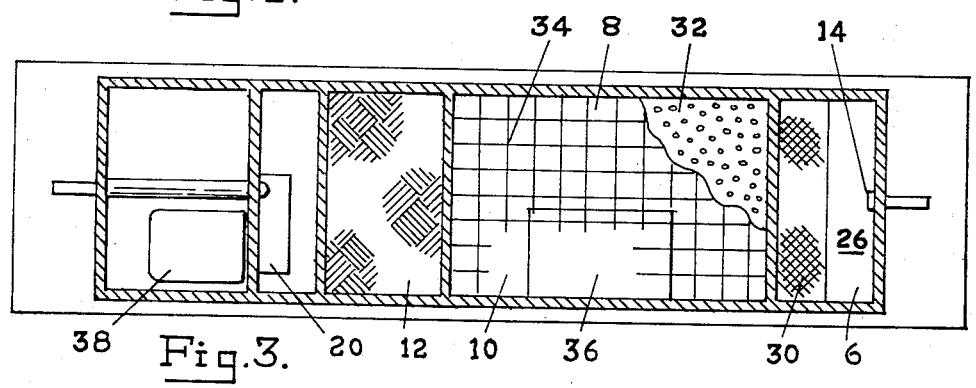
FIG. 3 is a plan view of the water reconditioning unit according to the present invention with the top removed.

As shown in FIGS. 2 and 3 said tempering cell 10 includes a thermostatically controlled heater 36 adjustable to raise the temperature of the water to an acceptable level. For reasons of safety, said heater 36 is, in this embodiment, wired in parallel with pump motor 38 to be described so as to ensure that it cannot be turned on until and unless motor 38 is in operation.

Cell 12 communicates with tempering cell 10 through an opening 40 located at the bottom thereof; said cell 12 containing a charcoal filter 42 for "purifying" water filtered therethrough. As shown in FIG. 2, cell 12, in its turn, communicates with pump 20 through passage 44 which is positioned at its upper extremity.

By way of summary said inlet 14 is disposed in direct flow communcation with cell 6 which is in turn serially succeeded by filtration cell 8, cell 10, charcoal filter cell 12, pump 20 and finally outlet 18.

To perform maintenance on said water reconditioning unit 2 some of said cells are open-topped and in order to furnish access thereto said hood 22 is provided with a top 46 which is removable to expose said cells. As will be observed from FIG. 2 baffle 24 is attached to top 46 so as to be removable therewith as shown in dotted lines in FIG. 1 rendering cell bottom 26 readily accessible for maintenance purposes, as shown in FIG. 3.

In order to provide closure between said aquarium 4 and the interior of said unit, said unit 2 may further include valves 48 and 50 for inlet 14 and outlet 18, respectively. Ports 52 equipped with removable plugs 54 are provided for priming the system as and when required when it is placed into operation. Thereafter, upon opening said valves 48 and 50 said unit 2 is in communication with said aquarium 4 and ready for operation. It will of course be understood that when removable top 46 of hood 22 is in position as shown in FIG. 2, for example, said hood 22 which houses said cells is effectively sealed and the respective cells are isolated from each other except as hereinbefore noted.

Referring back to FIG. 1, it will be observed said water reconditioning unit 2 includes switch 56 for operating an optional light 58 shown in dotted lines in FIG. 2, switch 60 for operating electric motor 38 which propels said pump 20 and switch 62 for operating said heater 36; said light 58, motor 38 and heater 36 being conveniently connected to a single electrical circuit which is attachable to a power source as by electric plug 64.

What I claim is:

1. A water reconditioning unit for aquaria comprising:

a plurality of water conditioning cells assembled in series with each cell in flow communication with at least one neighbouring cell; at least one of said cells being a settling tank for trapping gross solids entrained in the water; another of said cells being a filtration cell which includes a filter for trapping fine solids; another said cell being a tempering cell including a thermostatically controlled heater and still another of said cells containing a charcoal filter; said settling tank being serially succeeded by the filtration cell, tempering cell and the charcoal filter cell;

an inlet at one end of said series in direct flow communication with said settling tank near the top thereof;

said settling tank being partitioned by a baffle depending into it from the top thereof to a level spaced from its bottom, said baffle serving to circulate water entering said settling tank downwardly then upwardly around said baffle back to the top of said settling tank from which it then spills into said filtration cell;

an outlet at the other end of said series;

a pump included in said series for drawing water into the series through said inlet, for circulating it in turn through each cell and for thereafter discharging it through said outlet;

a hollow hood in which said cells are housed, said hollow hood being seatable on an aquarium to cover it and position said cell series with the inlet and outlet aforesaid in communicating relation with the aquarium;

said cells being open topped, and said hollow hood including a removable top providing access to said open topped cells.

2. A water reconditioning unit as defined in claim 1 wherein:

said pump includes an electric motor and said thermostatically controlled heater is wired in parallel therewith preventing operation of said heater except contemporaneously with said motor.

* * * * *